(12) United States Patent
Regueiro

(10) Patent No.: US 6,854,439 B2
(45) Date of Patent: Feb. 15, 2005

(54) PRECHAMBER COMBUSTION SYSTEM

(76) Inventor: Jose Francisco Regueiro, 1470 Ashton Dr., Rochester Hills, MI (US) 48309-2249

(*) Notice: Subject to any disclaimer, the term of this patent is extended or adjusted under 35 U.S.C. 154(b) by 0 days.

(21) Appl. No.: 10/378,281

(22) Filed: Mar. 3, 2003

(65) Prior Publication Data
US 2003/0213461 A1 Nov. 20, 2003

Related U.S. Application Data
(60) Provisional application No. 60/361,268, filed on Mar. 2, 2002.

(51) Int. Cl.[7] .................................................. F02B 19/08
(52) U.S. Cl. ..................... 123/263; 123/193.6; 123/281; 123/293
(58) Field of Search .............................. 123/193.6, 262, 123/263, 269, 276, 279, 281, 293

(56) References Cited

U.S. PATENT DOCUMENTS

| | | | | |
|---|---|---|---|---|
| 1,700,903 A | * | 2/1929 | Marburg | 123/293 |
| 1,887,072 A | * | 11/1932 | Suder et al. | 123/293 |
| 2,804,858 A | * | 9/1957 | Schilling | 123/262 |
| 4,442,807 A | * | 4/1984 | Latsch et al. | 123/263 |
| 5,392,744 A | * | 2/1995 | Regueiro | 123/262 |
| 5,515,823 A | * | 5/1996 | Kawamura | 123/262 |
| 5,924,402 A | * | 7/1999 | Regueiro | 123/293 |

FOREIGN PATENT DOCUMENTS

| | | | |
|---|---|---|---|
| DE | 3805639 | * | 9/1988 |
| GB | 2101207 | * | 1/1983 |

* cited by examiner

Primary Examiner—Tony M. Argenbright

(57) ABSTRACT

An improved combustion system particularly for a larger type diesel engine featuring a prechamber with a generally cup-shaped bottom tip portion facing the engine's main combustion chamber and with a central transfer passage substantially aligned with the centerline of the prechamber and a plurality of additional transfer passages circumferentially arranged about the centerline of the prechamber. The improved complete combustion system uses a piston with a deep bowl formed in the piston crown into which the central transfer passage directs a strong direct charge of products of combustion from the prechamber.

13 Claims, 7 Drawing Sheets

SECTION 3' — 3'

PRECHAMBER COMBUSTION SYSTEM

RELATED APPLICATION

This utility application claims benefit of Provisional Application Ser. No. 60/361,268 filed Mar. 2, 2002 having the same title and by the same sole inventor.

TECHNICAL FIELD

This invention relates to internal combustion engines and more particularly to diesel engines having a pre-combustion chamber.

BACKGROUND OF THE INVENTION

The U.S. Pat. No. 5,392,744 to Regueiro, entitled "Precombustion Chamber for a Double Overhead Camshaft Internal Combustion Engine" which issued Feb. 28, 1995, discloses a prechamber construction for a diesel engine in which a plurality of transfer passages are formed in the bottom of the prechamber. The passages are circumferentially spaced about the prechamber's centerline and the longitudinal axis of each passage is inclined with respect to the centerline to provide rotation of the air about the centerline. Each passage is tapered with a narrow end opening to the prechamber and a larger end opening to the engine's combustion chamber. The two ends of a passage extend circumferentially about the prechamber's centerline and situated about 90 degrees from one another. One purpose of the tapered and circumferentially aligned passages is to induce swirl first within the prechamber as air is introduced by upward movement of an associated piston in the engine's cylinder. Another purpose is to distribute and diffuse products of combustion from the prechamber into the combustion chamber and specifically direct flows toward the pockets formed in the piston for valve relief.

The combustion system described in the '744 patent was primarily useful for smaller, high-speed diesel engines as would be used on automobiles and light trucks. It was intended to facilitate combustion in the combustion chamber near the periphery of a piston. This is common in a majority of modern open-chamber type (DI or direct injection) diesels. On these relatively small engines it is difficult to locate the uppermost piston ring very close to the upper surface or crown of the piston as is desirable to minimize the annular volume formed between the piston and cylinder wall above the piston ring referred to as the headland height. Reduction of the headland height without provision for cooling the adjacent piston volume and cylinder wall tends to cause the piston ring to operate at very high temperatures. At high temperatures, the ever present soot accumulates in the ring grooves and can be "coked" thus cause the rings to stick in the grooves and to lose their sealing effectiveness which requires an engine overhaul to correct.

Piston ring overheating partially stems from the inherent design of the aforedescribed small diesel engines. They typically have cylinder liners integrally formed in the parent metal of the block and they usually have a closed-top block type design resulting in a thick top deck of the block. These factors are detrimental to maximizing cooling of the upper portion of the cylinder bore wall. Ring temperatures are further increased by the relative thickness of the upper portion of the piston's periphery necessitated to withstand the pressure-generated forces of combustion on the attendant high temperatures. The piston's thickness at its upper periphery where the rings are mounted limits the cooling effectiveness of the engine oil within the piston interior.

A solution for preventing a piston ring from attaining an undesirably high temperature is to increase the headland height which is effective to prevent coking of the piston ring in its groove. Of course, the peripheral portion of a typical aluminum piston above the uppermost ring must be formed with a sufficiently decreased diameter relative to the cylinder wall to allow for the maximum thermal expansion of the piston to prevent rubbing. Thus, increasing the headland height causes the piston/cylinder wall clearance to be increased which undesirably results in a larger headland volume of cooler trapped air. This is a particular concern when a diesel is started in a cold environment where the contraction of the aluminum piston increases the headland clearance and creates such a large volume of trapped air that the heat of compression at the injection point is so absorbed that starting is inhibited. It is believed that as much as twenty-five percent of the air can escape to the relatively cool headland clearance under cold start conditions. Contact of this large volume of air with the cool walls of the cylinder and piston increases the air's density and mass which robs the central portion of the combustion chamber of an equivalent mass of air. This air in the headland cavity or crevice is referred to as "inactive air" as opposed to the air in the remainder of the combustion chamber which is "active air". Under cold starting conditions, the ratio of active to inactive air decreases and with it the compression pressure and temperature of the active air decreases. This factor undesirably limits the minimum starting environmental temperature for the engine.

On any engine, the surface-to-volume (S/V) ratio in a combustion chamber when at TDC during a compression stroke is an inverse function of the cylinder displacement. Small engines have high S/V ratios and larger engines have lower S/V ratios. This effect is discussed in SAE Paper 940205 authored by applicant and Salo J. Korn, and entitled "Geometric Parameters of Four Valve Cylinder Heads and Their Relationship to Combustion and Engine Full Load Performance." This paper was presented in Detroit, Mich. at the 1994 SAE International Congress and Exposition meeting Feb. 28 to Mar. 3, 1994. The higher the S/V ratio, the higher the heat loss from the chamber to engine coolant. The cold start problem is aggravated by and linked to the higher compression ratios typically used for relatively small diesel engines. Higher compression ratios mathematically increase the S/V ratio by reducing the clearance volume relative to the remainder of the chamber. The air being compressed in a cold engine having a high S/V ratio and a high compression ratio when started in a cold environment looses a very significant quantity of its temperature. This is compounded by the effect of a large amount of inactive air. Further, prechamber type engines have additional losses incurred by the high S/V ratio of the prechamber. Starting at increased elevations or under cold ambient temperatures increase the difficulty. Thus, it is understandable why so many small diesels utilize a glow-plug starting aid. The '744 patent discloses an optional heating element to solve cold-startability problems.

The prechamber described in the '744 patent does not specify a specific thickness for the bottom wall of the prechamber tip through which the transfer passages extend. Work with this prechamber design indicates that the relatively thick bottom indicative of the views in the '744 patent are quite excessive and unnecessary. This unnecessarily led to the specification that the circumferential spacing between the smaller end and the larger end of a passage was rotated about 90 degrees. The illustrated relative thickness of the prechamber bottom or tip also implied long transfer passages requiring a smaller opening to the prechamber than otherwise would be provided. The small opening of the transfer passage does desirably produce strong swirl action but also undesirably inhibits the flow of air into the prechamber and the products of combustion out of the prechamber and into the combustion chamber. Thus, it could be judged that the prechamber as illustrated and described in the '744 patent is thermodynamically unbalanced, favoring one of its functions (swirl production) versus a second important function, i.e., effective filling of the prechamber with air and discharge of the products of combustion. Therefore, as it becomes necessary to enlarge the minimum cross-section of a transfer passage and shortening its length, the 90 degree circumferential spacing of the ends of the transfer passage of necessity change. If the 90 degree spacing is maintained, the desirable alignment of the transfer passage with a combustion pocket or valve relief in the piston would not be formed.

The '744 patent did not specify the configuration of the portion of the prechamber directly between the main interior volume and the bottom tip wall, commonly referred to as the "throat", simply assuming it to be a straight section as is common practice. While such a throat section is necessary if a newly designed prechamber is intended to be used as a retrofit in an older engine in which the original prechamber was threadably installed in the cylinder head, this need not be the case when a newly designed prechamber is intended to be used in a newly designed cylinder head. In such a case, it is preferable to eliminate the throat portion, which is restrictive to air flow, and blend the walls of the main prechamber directly with the tip portion. This allows a conical design for the main body of the prechamber which reduces its S/V ratio and its heat losses. Also, it is simpler, lighter, and cheaper to make. As a conical body cannot be threaded, the newly designed prechamber would have to be clamped to the top of the cylinder head using conventional methods. This approach allows the lower sealing seat of the prechamber to be placed anywhere along the tapered wall which is beneficial as explained hereinafter.

The subject improved combustion chamber makes use of deep bowl pistons which in their basic form were used much earlier by the open-chamber (no prechamber) type British Gardner engines and also by the later open-chamber Murphy engines from Milwaukee. Neither of these engines included internal oil cooling for the piston rings nor location of the piston rings high on the piston.

SUMMARY OF THE INVENTION

For the subject improved design for the bottom wall of the prechamber tip, it has been found that a cup-like shape is essential. The cup-shape can be either as hemisphere or a section of a hemisphere. The hemispherical section presents a larger surface at the bottom of the prechamber tip than a flat or only slightly curved portion. The larger surface allows either more circumferentially spaced transfer passages or increased diameter passages to improve air flow and reduce pumping losses. An additional benefit of the hemispherical design is the improved opportunity to align the transfer passages at a desired radial angle with respect to the centerline of the prechamber structure. Also, machining of the passages can be accomplished at a more normal angle to the hemispherical surface of the tip. The additional volume and surface of the tip portion also permits use of an extra tapered transfer passage disposed in the center of the cup-shaped tip, essentially aligned with the centerline of the prechamber body. This is particularly useful in association with a piston configured with a deep central bowl which pistons are often used in larger diesel engines. The benefits of this new design will be discussed hereinafter.

Accordingly, a very significant advantage of the newly designed prechamber and combustion system is the wide option of radial angles available for the multiple transfer passages in the cup-shaped tip portion. Another advantage is the narrower angle with respect to the prechamber centerline, which is beneficial with the prechamber positioned centrally with respect to the centerline of the cylinder for discharging combustion products directly into the deep central bowl formed in an associated piston. It is also very adaptable for use with older single intake/single exhaust valved engines with the centerline of the prechamber angled substantially with respect to the centerline of the cylinder so that the tip portion can essentially share the area around the center of the cylinder head fire deck between the intake and exhaust valves. It is also adaptable to use with an engine with pistons having conventional shallow bowls because of the inherent advantage of the wide shape in the new cup-shape tip configuration with the desirable radial inclinations of the centerlines of the transfer passages in relation to the centerline of the prechamber. For example, even if each passage is inclined by 45 degrees in relation to the prechamber centerline and even if the prechamber itself is inclined by as much as 15 degrees to the centerline of the cylinder, for even the passage with greatest inclination, the total 60 degrees of inclination produces an acceptable 30 degree angle with respect to the combustion chamber's fire deck. On the other hand, the total minimum inclination of any transfer passage at the opposite side of the prechamber tip would still be at 30 degrees but angled from the centerline of the piston for discharge at a perfect angle for a desirable deep bowl type configured piston. This is more acceptable than providing a single discharge from the prechamber at only a 15 degree inclination with respect to the piston centerline, or in other words almost straight at the surface of the piston which is typical of some older prechamber designs. With the straight-on flow, it impinges the piston with sufficient thermal and kinetic energy that typically, a "heat dam" configuration on the piston is necessary to prevent heat-checking and burning.

The subject prechamber design and combustion system is particularly useful with larger diesel engines which by mathematical definition have low S/V ratios and relatively low compression ratios. Many of these engines are used for marine propulsion and for electrical generation aboard ships. These engines do not need glow-plug starting aids as either the engine rooms are always warm or because they operate in tropical climates. These engines do not need hill climbing capacity either. Many of these large engines do not use electric starter motors instead either use powerful hydraulic or air powered motors. Some inject high pressure air into the cylinders. These non-electric starters typically rotate the engines faster and do not have overheating problems. They also usually preclude the use of glow plug starter aids. The subject new design for the prechamber and combustion system does not anticipate use of such glow plugs as a starter aid in all cases.

Many modern large diesel engines use a piston with a cast-in oil cooling passage or gallery construction. The cast-in cooling gallery extends radially inward from the piston ring grooves and substantially parallel to the grooves. This is an effective method of cooling the piston rings, particularly the uppermost compression ring and allows the ring to be located closer to the top of the piston. Thus, headland height and volume can be decreased for improving cold starting as well as improving combustion generally.

Less trapped air in the headland crevice permits more air availability for combustion. Resultantly, output is increased, fuel consumption is lowered, noise is decreased, emissions and smoke are decreased. Typically, these cooling passages in the piston are formed by an expensive process called "salt-core" casting using a core of salt soluble in water so as to be easily dissolved after the piston is cast. The process requires formation of a hole which is aligned with an oil cooling jet of the engine which is aimed upward from a source of pressurized oil in the crankcase. A jet for each piston is typically supplied oil from a gallery extending the length of the engine. The engine's oil pump must be expanded to handle the extra task. The larger capacity pump increases parasitic losses. The losses are particularly undesirable during cold starting where the cold oil increases the load on the oil pump out of proportion resulting in a reduction of the engine's cranking speed.

It is believed that the aforedescribed annular piston oil cooling passages are formed in a full circle with one inlet passage to receive the oil from the oil jet and another passage to drain the oil back to the crankcase.

Other large diesel engines, for example manufactured by John Deere and by Detroit Diesel, employ "headland rings" which are separate rings disposed high on the piston so that they practically eliminate the headland crevice volume. They are accompanied by special water cooled cylinder liners running coolant through the top flange portion of the liner so as to provide sufficient cooling to allow highly placed piston rings. Both of these designs add considerable cost to the engine and are not desirable for retrofit on older engines without major redesign.

The subject invention involves an effective combustion system for large diesel engines utilizing a piston with a central deep bowl so that a majority of the main-combustion takes place around the center of the cylinder. This effectively reduces the temperature at the periphery of the piston crown to allow a highly placed compression ring. This also allows oil thrown up from the crankshaft bearings to reach an area of the piston's interior close to the compression ring. In the subject piston design, it is also possible to form a couple of short cooling galleries in the thick section formed by the piston-pin struts.

The deep bowl piston requires a prechamber discharge directed at a shallower angle than the larger angle disclosed in the '744 patent. The cup-shaped tip portion of the subject prechamber is effective in applying the required flow. It is also effective in delivering flow essentially along the centerline of the piston and cylinder through the central transfer passage unlike the orientation of the transfer passages of the '744 patent which directed flow outward to specific valve-relief pockets formed in the piston. Additionally, the '744 patent limited the number of transfer passages to equal the number of valve relief piston pockets; a limitation on larger engines on which a larger number of transfer passages improves the coverage of the main chamber by the transfer passages.

These and other features, objects and advantages of this invention will become more apparent from the following detailed description and the drawings on some preferred embodiments of the invention.

In accordance with one aspect of the invention, an internal combustion engine has a cylinder and a piston reciprocally movable in the cylinder and a cylinder head is secured over the cylinder and piston to form a combustion chamber. At least one intake port and one exhaust port and respective intake and exhaust valves are provided. A precombustion chamber, preferably having a conically shaped lower body is in communication with the engine's combustion chamber through multiple tapered transfer passages formed through a cup-shaped tip portion of the precombustion chamber structure. Each transfer passage has a narrow open-end facing the precombustion chamber and a wider open-end facing the engine's combustion chamber.

A feature is that the transfer passages are preferably spaced circumferentially about a central axis of the precombustion chamber and additionally, another transfer passage is located centrally at the bottom of the tip portion of the precombustion chamber and essentially along the centerline of the precombustion chamber. The longitudinal axis of each transfer passage is inclined in two angles with respect to the centerline of the precombustion chamber; a relatively shallow radial angle disposed in the same central plane as the precombustion chamber and a second angle disposed on a plane parallel to the centerline of the precombustion chamber. The first angle serves to maximize the utilization of the metal forming the bottom of the tip portion of the precombustion chamber, essentially separating the tapered transfer passages from one another, to provide the maximum-possible mechanical strength while allowing the largest-possible size of the transfer passages. The second angle generates, during the compression stroke, the internal swirl in the precombustion chamber for improved mixing with the injected fuel, for faster ignition of the fuel, and for faster combustion of the mixture. Upon discharging the products of combustion, this second angle generates a straight discharge, but since its point of inception is tangential to the precombustion chamber cup-shaped tip portion, its flow path is slightly longer than if the discharge was purely in a radial direction. This feature serves to maintain the plume of products of prechamber combustion airborne for a longer path, improving their mixing with the air in the main combustion chamber.

Depending on the size and needs of the associated engine, the cup-shaped tip portion of the precombustion chamber, can have a large plurality of circumferentially disposed passages, as many as ten it is believed. Also, a large sized central passage relative to the other passages is possible.

The top of the piston has a deep central bowl formed therein and integrally attached at a peripheral edge to an outer cylindrical side wall defining an annular internal space therebetween radially inward slightly from grooves housing piston rings. The annular space is open to the engine crankcase at the piston's bottom to receive cooling oil from the engine.

According to another aspect of the invention, the precombustion chamber has a plurality of tapered transfer passages communicating with the engine's main combustion chamber. One passage is disposed along the centerline of the precombustion chamber and the remainder are circumferentially spaced about a central axis of the precombustion chamber. The axis of each circumferentially spaced transfer passage is inclined at two angles with respect to the centerline axis of the precombustion chamber.

Accordingly, an object of the present invention is to provide a new and improved combustion system for a divided chamber diesel engine characterized by a reduced pressure loss gas transfer between the precombustion chamber and the main combustion chamber, resulting in an increased potential energy release during the precombustion portion of the engine cycle and improved flow of burning fuel from the interior of the precombustion chamber into the main combustion chamber during the expansion portion of the engine cycle. This reduces the heat loss attributable to the transfer passages and increases the combustion rate in both the prechamber and the main combustion chamber which allows a retardation of engine injection timing.

Another object of the present invention is to provide a new and improved combustion system for a precombustion chamber engine that incorporates a precombustion chamber with a generally cup-shaped bottom tip portion protruding into the engine's main combustion chamber for discharging the products of combustion of the precombustion chamber for improved coverage of the main combustion chamber.

A further object of the invention is to provide a precombustion chamber which increases the mass of products of combustion in the precombustion chamber for discharge into a deep bowl of an associated piston, thus lowering the temperature on the periphery of the piston's crown and reducing the temperature of the piston rings while decreasing headland crevice height and volume thus improving the engine's startability and reducing fuel consumption, emissions, smoke, and noise.

Other objects, advantages, and features of the invention will become apparent from the following detailed description of the invention taken in conjunction with the following drawings in which:

DETAILED DESCRIPTION OF EMBODIMENTS OF THE INVENTION

Figure 1:
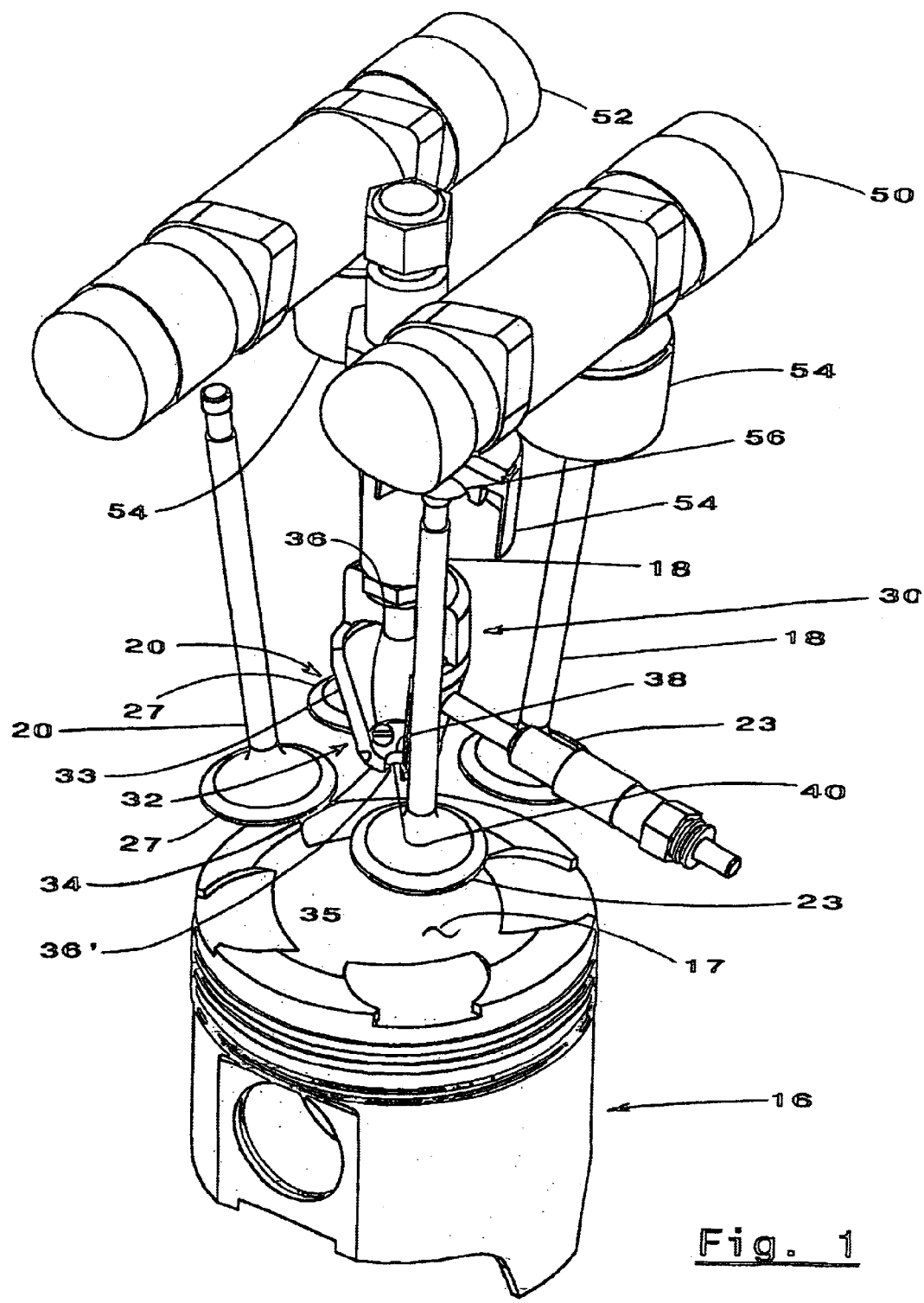
FIG. 1 is a perspective and somewhat schematic view of an engine piston, associated valve components, and precombustion chamber assembly.

Referring specifically to FIG. 1, a combustion chamber for a large diesel engine is defined including a piston 16 adapted to reciprocate in a cylinder bore (not shown). Although not shown, a crankshaft and connecting rod are operatively connected to the piston 16 as is conventional in such engines. It should be understood that though only one combustion system is shown, an engine would likely include multiple combustion chambers. A valve timing mechanism includes two camshafts 50 and 52 with axes extending in the longitudinal direction of the engine. Intake camshaft 50 and exhaust camshaft 52 rotate to operate respectively a pair of intake valves 18 and a pair of exhaust valves 20 located in the associated cylinder head (not shown).

The piston 16, associated cylinder, and associated cylinder head define a main combustion chamber 35 above the piston 16 which defines the bottom wall thereof. The side walls of the combustion chamber 35 are defined by the engine's cylinder bore and the upper or top surface of the combustion chamber 35 are defined by the engine's cylinder head. The piston 16 in FIG. 1 has moved downward from its TDC (top dead center) position to a lower position during an expansion stroke to about 75 degrees C.A. (crank angle). As is conventional, the cylinder head has intake and exhaust ports to the combustion chamber sealed by enlarged head portions 23 of intake valves 18 and head portions 27 of the exhaust valves 20 when the valves are in a closed operative position. The intake and exhaust ports are connected to intake and exhaust passages for introducing air to the combustion chamber and allowing the discharge of products of combustion from the combustion chamber. The intake and exhaust camshafts 50, 52 engage the upper ends of the valves 18, 20 through special tappets 54, which use an internal hemispherical joint 56. The tappet construction is disclosed in U.S. Pat. No. 5,570,665 to Regueiro, entitled "Valve Train for Internal Combustion Engine", which issued Nov. 5, 1996.

Figure 2:
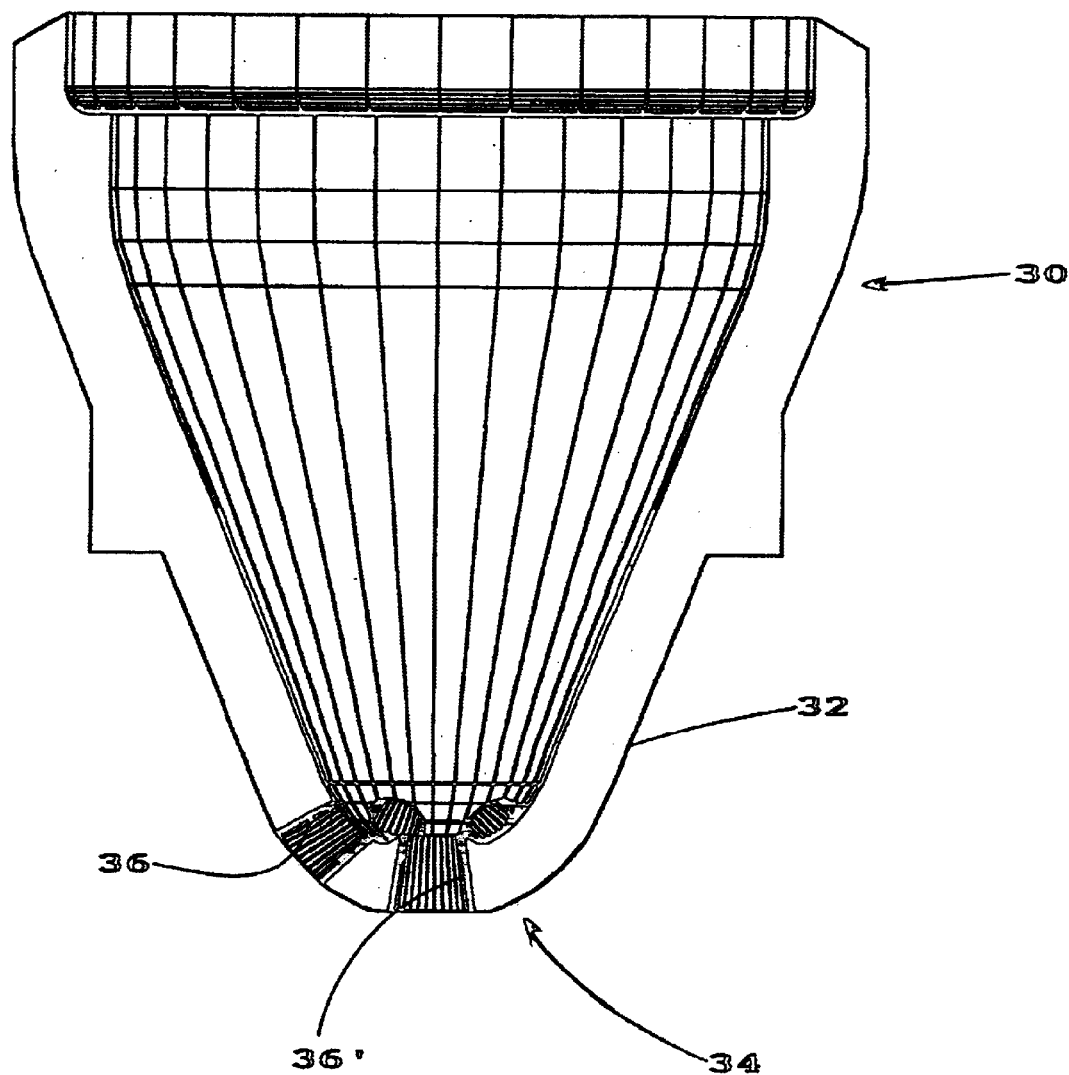
FIG. 2 is an enlarged cross-sectional view of the precombustion chamber assembly shown in FIG. 1.
Figure 4:
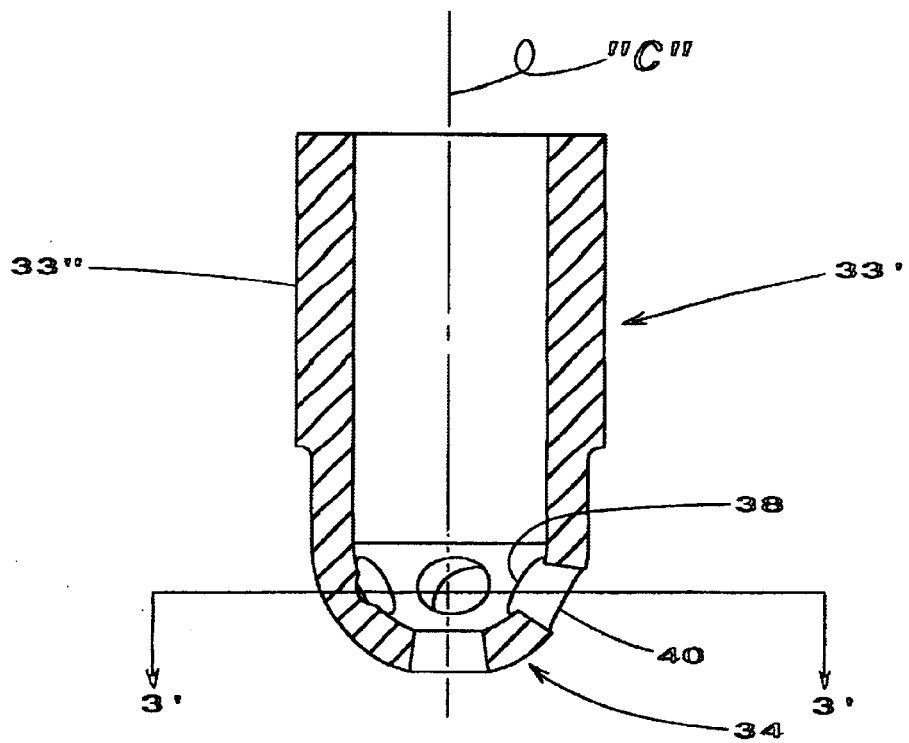
FIG. 4 is an enlarged cross-sectional elevational view of the bottom tip portion of the precombustion chamber assembly shown in FIG. 3.
Figure 5:
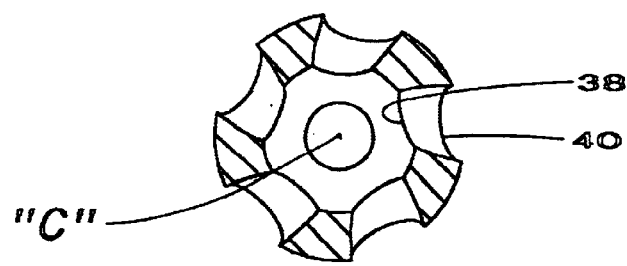
FIG. 5 is a cross sectioned planar view of the bottom tip portion of the precombustion chamber assembly shown in FIG. 4 and taken along section line 3'—3' in FIG. 4.

A prechamber assembly 30 is located substantially central to the four valves and the axial centerline of the piston 16 and the cylinder bore in which it reciprocates. The prechamber 30 is formed with its lower body portion 32 tapered in a conical shape to fit in a corresponding tapered space formed between the valve heads 23, 27 and intake and exhaust ports. The bottom tip portion 34 of the prechamber 30 which protrudes into the main combustion chamber 35 is cup shaped and preferably formed as a section of a hemispherical cup. The tip portion 34 is directly connected to the lower end of the conical wall portion 32. The conical wall smoothly joins the upper wall portion of the prechamber 30 and the cup shaped tip portion 34 to eliminate a conventional straight throat portion common in other prechambers. As best seen in FIG. 2, a plurality of transfer passages 36, 36' are formed through the bottom wall of tip 34. One passage 36' preferably extends along its main axis or centerline of the prechamber structure. The others 36 are circumferentially disposed about the centerline toward the periphery of the tip's cup shape and are angled in two planes as explained herein after. The passages 36, 36' are preferably circular and are tapered as shown in FIGS. 2, 4, and 5. The smaller opening 38 of the tapered transfer passage 36 faces the interior of the prechamber 30 and the larger opening 40 of the passage faces the main combustion chamber 35. While a circular opening for the passages is easier to form and desirable, other shapes could be employed such as a square, triangular, or rectangular hole.

FIG. 2 shows a cross-section of the above mentioned tapered throatless prechamber 30 in which the conical wall 32 blend smoothly with a section of a generally hemispherically shaped tip portion 34. The smooth blend of the wall results in improved fluid flow which further reduces heat losses from the prechamber thus improving efficiency.

Figure 7:
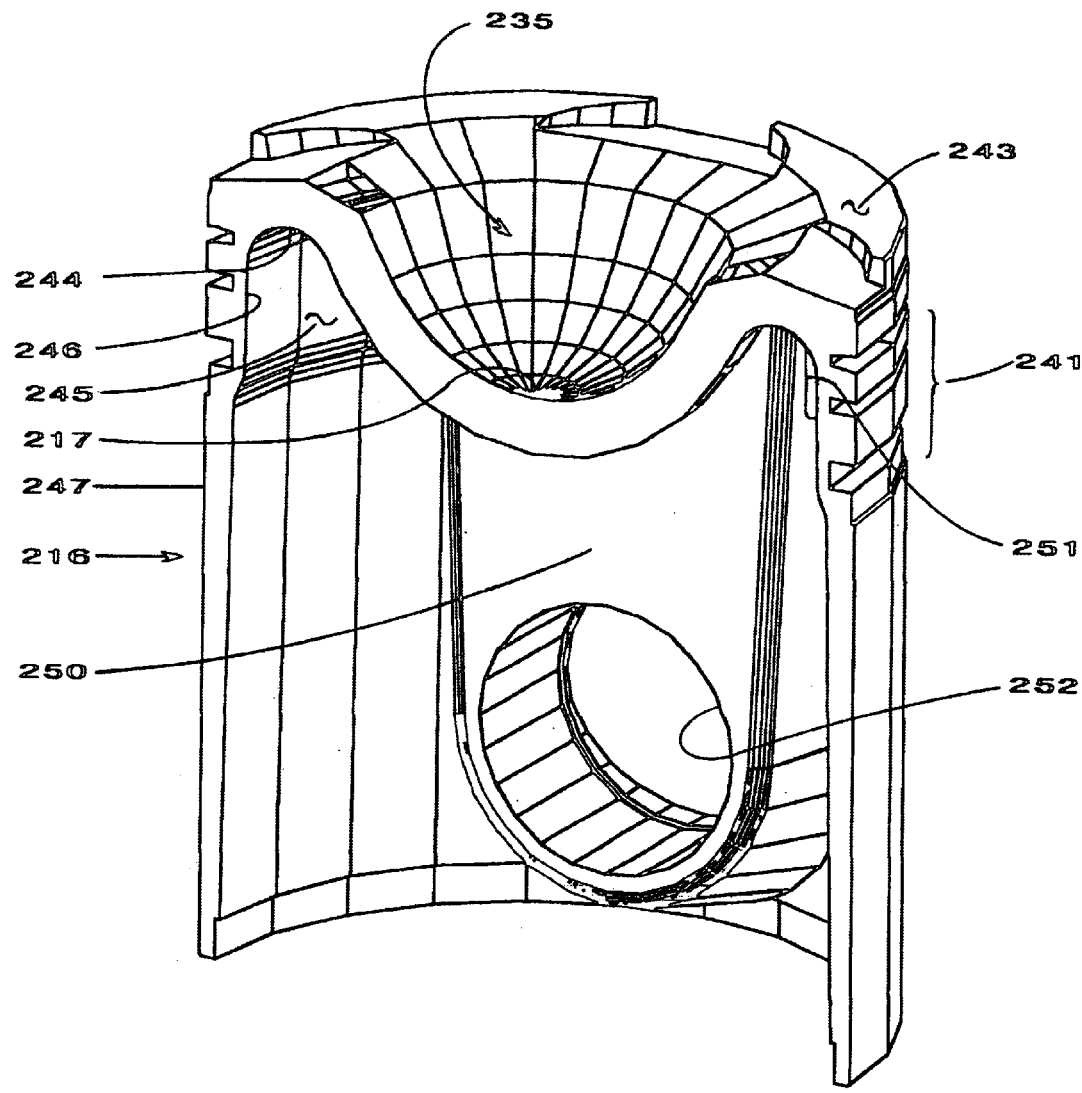
FIG. 7 is a cross-sectional elevational view of a deep bowl type piston of the subject combustion system.

During engine operation and particularly during a compression stroke of the piston, the large straight central transfer passage 36' creates a strong, straight flow into the center of the prechamber 30. This strong flow induces flow through the other passages 36 by venturi like action to produce a self-induced flow improvement into the prechamber 30 with minimum pumping losses. Because of the inclination of the axis of the each passage 36 in a tangential plane, the flow through the passages 36 induces air-swirl within the prechamber 30. This helps to accelerate fuel ignition and subsequent prechamber combustion. After combustion initiation in the prechamber 30 the products of prechamber combustion are discharged into the main chamber 35 through the central transfer passage 36' in a strong direct flow toward the piston crown. Where a deep bowl type piston 235 can be effectively utilized as shown in FIG. 7, the direct, strong flow is capable of reaching well into the lowest confines 217 of the deep main combustion bowl. Also, flow through the other transfer passages which are at an inclination to the centerline of the prechamber 30 in two planes improves flow distribution into the higher levels of the combustion chamber 35. This process is also enhanced by the included angles between the transfer passages 36 to create a cone with the desired distribution shape for optimum combustion in the main chamber (i.e.; the individual discharge sprays form a compound angle to the axial centerline "C" of the prechamber as shown in FIG. 4). The angle, properly selected for each cylinder displacement and desired combustion characteristics of the engine, and the diffused spray by the discharge of the transfer passages 36, allows for optimized coverage of the main chamber and faster combustion therein and results in improved overall combustion efficiency. The resultant faster combustion, both in the prechamber and in the main chamber, allows an optimum injection timing retardation resulting in reductions in emissions of NO., soot, PM and smoke. Also, modest increases in engine efficiency and reduced cylinder Rate of Pressure Rise (ROR), Pmax and noise are realized.

The "throatless" conically shaped prechamber design with a cup-shaped bottom tip offers many advantages. Firstly, the total flow area of the transfer passages is increased significantly, especially with the one passage at the bottom and substantially along the centerline of the prechamber. Secondly, the flow-coefficient is increased significantly. Thirdly, a strong swirling action of air is generated in the prechamber interior during filling which produces faster ignition and more-efficient combustion therein. Fourthly, the prechamber pumping losses are reduced. Fifthly, the coverage in the main combustion chamber by the products of prechamber combustion is significantly improved and the combustion process in the main combustion chamber is greatly accelerated. Sixthly, the prechamber's S/V is reduced, especially due to the absence of a "throat" portion. Also, heat losses associated with the prechamber are reduced. Seventhly, the subject improved design, as compared to the design for small engines described in the '744 patent, uses a thinner wall of metal at the very bottom tip portion of the prechamber which permits shorter and less restrictive transfer passages. With the shorter passages, for any specific area of the larger open end of a passage facing the main combustion chamber, the smaller open end of the passage which faces the protrusion of the cupped portion at the tip into the interior of the prechamber, can be made larger than with the corresponding opening according to the teachings of the '744 patent. Eighthly, with the cup formed as a section of a hemisphere, the blended transition to the conical prechamber walls is very gradual which reduces the heat losses as well as the thermal stresses at this critical point, thus making for a stronger prechamber able to withstand the environment of protruding into the main combustion chamber.

Figure 3:
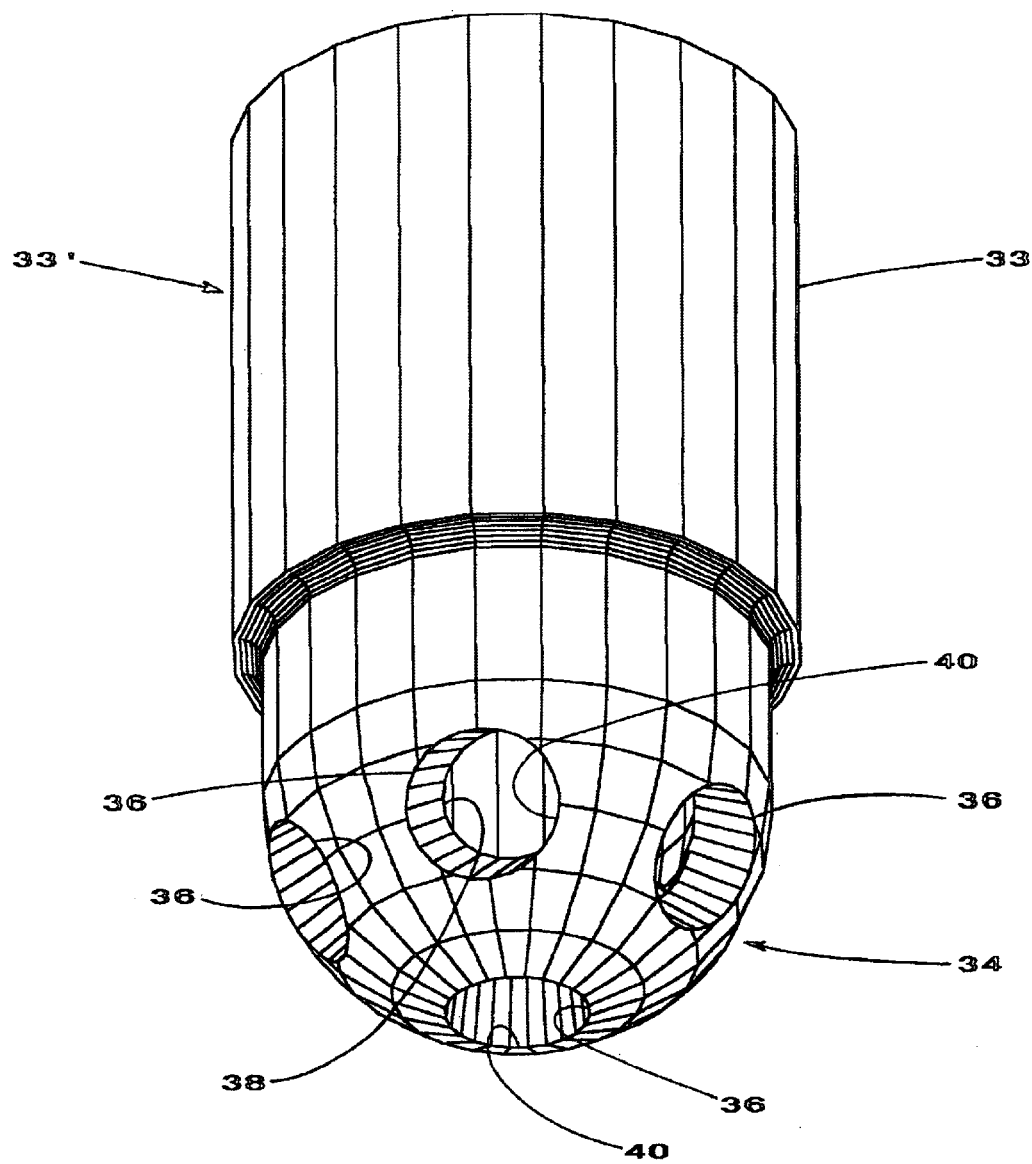
FIG. 3 is a perspective partial view of a second embodiment of the bottom tip portion of the precombustion chamber assembly.

FIGS. 1 and 2 show the entire "throatless" conical prechamber. In FIGS. 3 through 5 only the bottom-tip portion 33' for a more conventional throated prechamber is shown in which, by necessity the throat portion 33' must be straight to allow either a threaded connection to the cylinder head or a smooth-sided configuration for use with a prechamber which is conventionally clamped to the top of the cylinder head. In FIGS. 3–5, the threads are not shown, but there is sufficient material to form them. With the straight-sided throat portion 33' the lower cup-shaped tip 34 can be constructed as a fully-hemispherical cup as shown.

Figure 6:
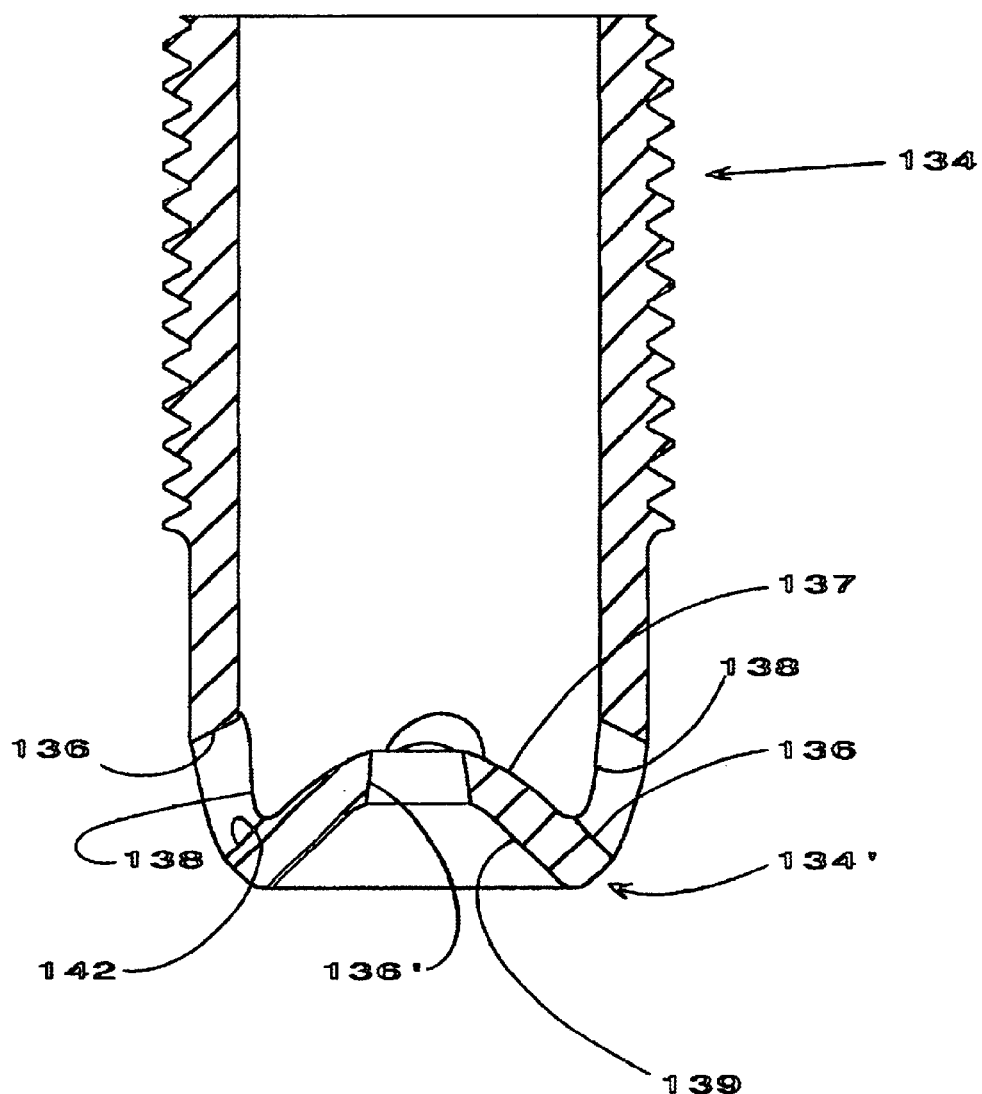
FIG. 6 is a cross sectioned elevational view of the bottom tip of a third embodiment of the precombustion chamber assembly.

FIG. 6 shows another embodiment of the bottom tip portion 134 for a prechamber (not shown) similar to the prechamber associated with the tip shown in FIGS. 3 and 4 except that the very bottom wall 134' is not formed as a hemispherical cup but as a concave cup. This has advantages: firstly, the axial penetration of the bottom tip 134' into the main combustion chamber is much reduced. Secondly, the flow of air into the prechamber interior through the bottom transfer passage 136' is enhanced (has a higher flow-coefficient) by being aided by the funnel-like construction of the wall surface 139. Thirdly; the air-inflow into the prechamber is also enhanced through the other transfer passages 136 for two reasons: one, the already-mentioned higher flow through the center passage 136' creates a venturi action which enhances the flow through the circumferentially-spaced passages 136 and two, because the internal portions 142 of the passages 136 do not enter the interior of the prechamber sharply but smoothly flow into wall 137 on the interior of the tip portion. Other improvement of this design is that the discharge of the products of prechamber combustion flow out into the main combustion chamber with a higher flow coefficient through passages 136, as the wall portion 137 helps direct the gases to the passages 136. With this design, also, the main discharge of products of prechamber combustion, through the central transfer passage 136', has a longer path to travel from the prechamber into and through the main combustion chamber which increases coverage by offering a wider diffusing action and improves mixing and faster combustion in the main combustion chamber.

FIG. 7 illustrates a new piston design for use with the aforedescribed prechamber assembly to enhance the combustion system particularly for larger sized diesel engines. The piston 216 provides a deep bowl configuration 235 generally at the centerline or axis of the piston. Desirably, the bottom surface 217 of the deep bowl 235 is formed at a maximum distance from the exterior surface of the prechamber's bottom wall of the tip portion. The great depth of the bowl minimizes impingement of the products of combustion forming a combustion plume discharged through the center passage of the aforedescribed prechamber tip portions onto the bottom wall 217 of the piston's bowl 235. The great depth also maximizes the plume's airborne path which is desirable for optimum mixing of the products of prechamber combustion with the air within the main combustion chamber and specifically with air in the bowl 235. The definition of "depth" concerning the bowl 235 is subject to different possibilities depending of the fact that, on conventional flat fire-deck engines, the bottom 217 of the bowl 235 can be deeper in relation to the piston crown 243 than when associated with cylinder heads featuring radially directed valves as disclosed in U.S. Pat. No. 5,570,665, entitled "Valve Train for Internal Combustion Engines", issued Nov. 5, 1996; U.S. Pat. No. 5,626,110; entitled "Valve Train for Internal Combustion Engines", issued May 6, 1997; U.S. Pat. No. 5,638,783; titled "Valve Train for an Internal Combustion Engine", issued Jun. 17, 1997; U.S. Pat. No. 5,645,023; entitled "Valve Train for an Internal Combustion Engine", issued Jul. 8, 1997; U.S. Pat. No. 5,651,337; entitled "Carrier for Camshaft and Tappet Support", issued Jul. 29, 1997; U.S. Pat. No. 5,669,344; entitled IISOHC System with Radial Valves", issued Sep. 23, 1997; U.S. Pat.

No. 5,673,660; entitled "Valve Train for Internal Combustion Engine", issued Oct. 7, 1997; U.S. Pat. No. 5,682,849; entitled "Rocker-Arm Tappet Connection for Radial Valves and Vertically Operating Crosshead", issued Nov. 4, 1997; and U.S. Pat. No. 5,921,210; entitled "Tappet Assembly for the Valve Train of an Internal Combustion Engine", issued Jul. 13, 1999. Because a radially directed valved cylinder head features a concave or hemispherical combustion chamber, part of the combustion chamber volume is located within the cylinder head and the center of the combustion chamber is higher with respect to the cylinder deck than on a conventional flat fire-deck combustion chamber cylinder head. To maintain the desired Compression Ratio for the engine, the volume and depth of the piston bowl must take into account the volume of the hemispherical combustion chamber above the piston. Accordingly a deep bowl will be shallower for a radial valved cylinder head then for a conventional flat fire-deck cylinder head design. The total distance between the bottom tip portion of the prechamber and the internal bottom wall 217 of the piston bowl 235 may or may not be equal to that on a conventional flat fire-deck design; but the internal bottom 217 of the bowl 235 in a piston for a radial-valve cylinder head will always be at a smaller distance to the crown of the piston than on a conventional flat fire-deck design.

With the subject deep bowl piston design it is possible to create an interior annularly shaped cavity 245 open to the engine's crankcase (located below than piston 216 in FIG. 7) into which lubricating oil thrown from the engine's crankshaft bearings can reach. The annular cavity may be broken at locations where the wrist pin struts are located but this is of limited peripheral dimension. The oil tends to cool the metal surface 246 of the piston skirt 247 which is radially behind the piston ring grooves 248. Thus, the metal in the proximity of the rings is maintained at a cooler temperature which of course allows the rings themselves to operate at a cooler temperature. This is accomplished in this application without using an expensive to manufacture and relatively heavy cast-in cooling gallery. With this design, it is still possible to maintain a cast-in cooling gallery for cooling in the vicinity of a wrist pin strut 250 (numeral 251 shows the end opening of such a gallery. The cooling oil reaches into this hollow gallery 251 by the generally annular sheet of oil thrown upward off of the crankshaft bearings. This oil also cools the under-surface of the piston crown 243 where open to the crankcase. With the new piston design, featuring a natural oil feed to the piston's under-side or crown, it is an object of eliminating the need for any conventional cooling jets and a special oil gallery in the cylinder block feeding the jets with pressurized oil. This simplification to the lubricating oil cooling system should allow a reduction on the size, capacity and power consumption of the engine's oil pump. The reduction in power consumption would directly increase the engine power while reducing the specific fuel consumption and emissions. The decrease in the size of the required oil pump and the elimination of need for cooling jets, should decrease the manufacturing cost of the engine.

Figure 8:
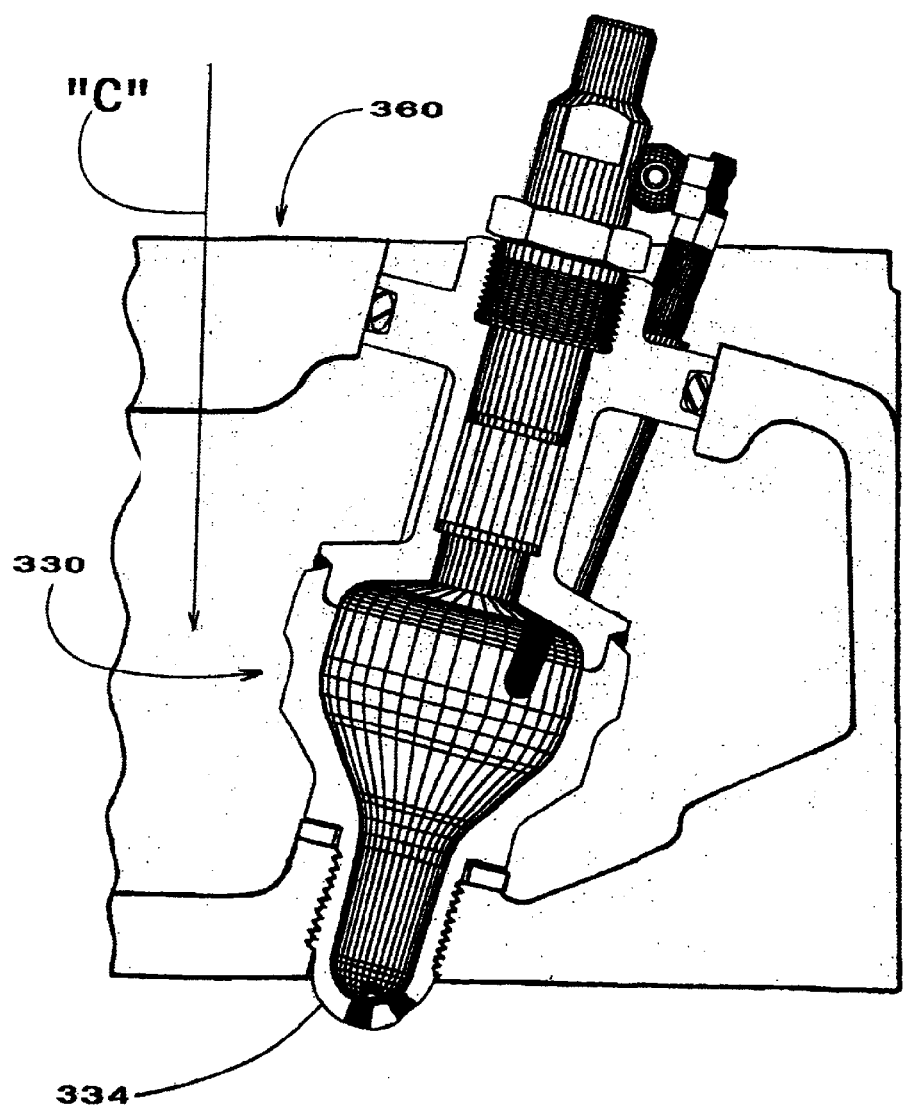
FIG. 8 is a cross-sectional elevational view of a precombustion chamber assembly mounted within a two valve type cylinder head.

FIG. 8 shows a portion of a cylinder head for a two-valve engine with an embodiment of the subject prechamber 330 mounted therein. The prechamber 330 incorporates the subject improved cup-shaped bottom tip portion 334. The prechamber 330 is threadably installed in the older style, large-displacement, two-valve engine. The prechamber 330 is installed at a 14 degree angle to the cylinder centerline "C" to provide space for the intake and exhaust valves (not shown), valves whose stem portions extend generally parallel to the cylinder centerline "C" in a conventional design for older two-valve engines. On this type of combustion system utilizing an inclined prechamber, a conventional piston with a relatively shallow bowl or the subject newly designed deeper bowl piston as described in relation to FIG. 7 can be used. A glow-plug 370 is shown but this starting aid is only an optional addition for some of the large engines and should not be considered a necessary part of the subject combustion system.

Various changes and modifications can be made to the prechambers described above without departing from the spirit of the invention. Such changes and modifications are contemplated and invention should be defined only by the following claims.

What is claimed is:

1. In an internal combustion engine having a cylinder and a piston movably disposed in said cylinder for reciprocal motion, a cylinder head secured over said cylinder and piston to form a combustion chamber, at least one intake port extending in said cylinder head and at least two intake valves mounted in said cylinder head for allowing air to be admitted into said combustion chamber, at least one exhaust port extending through said cylinder head and at least one exhaust valve mounted to said cylinder head for allowing exhaust gases to exit said combustion chamber, and a precombustion chamber housing an injector, the improved combustion system characterized by:

said pre-combustion chamber having a plurality of transfer passages communicating with said combustion chamber;

said transfer passages being circumferentially spaced about a centerline of said pre-combustion chamber;

said centerline of said transfer passages being angularly inclined in two different planes about said centerline of said pre-chamber to provide rotation of air entering said prechamber about its centerline;

said centerline of said pre-combustion chamber being approximately aligned with a centerline of said combustion chamber;

said prechamber having its bottom tip facing said combustion chamber formed as a cup protruding into said combustion chamber;

said piston has a deep central bowl, and a pair of open cavities separating the outside walls of said bowl from the interior walls of the piston skirt; said cavities being exposed to the crankcase of said engine block.

2. A pre-combustion chamber for an internal combustion engine as defined in claim 1 further characterized by:

said plurality of said transfer passages being formed with a narrow open end of such passages being in proximity to said pre-combustion chamber and a wide open end of said passages being in proximity to said combustion chamber;

3. A pre-combustion chamber for an internal combustion engine as defined in claim 2 further characterized by:

said plurality of said transfer passages being circular in cross-section.

4. A pre-combustion chamber as defined in claim 1 further characterized by:

an additional transfer passage formed approximately on the centerline of said bottom cup-shaped tip of said prechamber.

5. A pre-combustion chamber as defined in claim 4 further characterized by:

said additional transfer passage in said bottom cup-shaped tip of said prechamber having a small open end in close proximity to the interior of said prechamber and a large open end in proximity to said main combustion chamber;

said centerline of said additional transfer passage being essentially formed in said centerline of said prechamber.

6. The additional transfer passage as defined in claim 5 further characterized by:

being formed in a circular shape.

7. A pre-combustion chamber for a diesel engine; said pre-combustion chamber installed in the cylinder head of said diesel engine; said pre-combustion chamber featuring a housing with one opening to fit an injector in its top body; and a bottom body of said housing directly connected to a tip formed as a hemispherical cupped section; said tip exposed to and protruding into the main combustion chamber; fluid communication between said lower body of said pre-combustion chamber and said main combustion chamber being achieved through a plurality of transfer passages formed in the walls of said cupped tip; one of said plurality of said transfer passages being formed along said centerline of said pre-combustion chamber; the rest of said transfer passages being peripherally-disposed and circumferentially-spaced about said centerline of said pre-combustion chamber; said plurality of said transfer passages being formed in the shape of a taper of circular cross-section having a narrow open-end in proximity of said pre-combustion chamber and a wide-open end in proximity to said main combustion chamber; said peripheral transfer passages having their centerlines inclined in two planes with respect to said centerline of said pre-combustion chamber; said pre-combustion chamber further characterized by:

having the majority of the height of the interior surface of the lower side-wall of said bottom body of said pre-combustion chamber formed in a solid conical shape.

8. A pre-combustion chamber disposed in the cylinder head of a diesel engine; said pre-combustion chamber comprising a housing with an upper and lower body; said lower body formed with two distinct sections, one being the largely conical wall of said lower body itself, the other a bottom tip portion extending directly below said conical side-wall of said lower body and protruding into said main combustion chamber; said tip portion incorporating a plurality of transfer passages for fluid communication between the interior of said pre-combustion chamber and said main combustion chamber; said plurality of said transfer passages being disposed so that one of them is centrally-located in said tip portion, essentially aligned with the centerline of said pre-combustion chamber; and with the rest of said transfer passages being peripherally-disposed and circumferentially-spaced about said centerline of said pre-combustion chamber; said plurality of said transfer passages being formed in the shape of a taper of circular cross-section having a narrow open-end in proximity to said pre-combustion chamber and a wide-open end in proximity to said main combustion chamber; said peripheral transfer passages inducing rotation of the air entering said pre-combustion chamber by having their centerlines inclined in two planes with respect to said centerline of said pre-combustion chamber; said pre-combustion chamber further characterized by:

said bottom tip portion of said lower body of said pre-combustion chamber being formed as a cup within which a reverse cup is formed;

said reverse cup being smaller than the main cup in said housing of said pre-combustion chamber;

said reverse cup being formed as a section of a hemisphere; said reverse cup formed in the centerline of said prechamber; said reverse cup having its cupped surface in proximity to said prechamber formed starting at a vertical point below the horizontal line described by the lower end of the plurality of said peripheral transfer passages.

9. A pre-combustion chamber disposed in the cylinder head of a diesel engine; said pre-combustion chamber comprising a housing with an upper and lower body; said lower body formed with two distinct sections, one being the largely conical wall of said lower body itself, the other a bottom tip portion extending directly below said conical side-wall of said lower body and protruding into said main combustion chamber; said tip portion incorporating a plurality of transfer passages for fluid communication between the interior of said pre-combustion chamber and said main combustion chamber; said plurality of said transfer passages being disposed so that one of them is centrally-located in said tip portion, essentially aligned with the centerline of said pre-combustion chamber; and with the rest of said transfer passages being peripherally-disposed and circumferentially-spaced about said centerline of said pre-combustion chamber; said plurality of said transfer passages being formed in the shape of a taper of circular cross-section having a narrow open-end in proximity to said pre-combustion chamber and a wide-open end in proximity to said main combustion chamber; said peripheral transfer passages inducing rotation of the air entering said pre-combustion chamber by having their centerlines inclined in two planes with respect to said centerline of said pre-combustion chamber; said bottom tip of said lower body of said pre-combustion chamber being formed as a cup within which a reverse cup is formed; said reverse cup being smaller than the main cup in said housing of said pre-combustion chamber; said reverse cup being formed in the centerline of said prechamber; said reverse cup having its cupped surface in proximity to said prechamber formed starting at a vertical point below the horizontal line described by the lower end of the plurality of said peripheral transfer passages; said pre-combustion chamber further characterized by:

said outer surfaces of said cup-shaped bottom tip both being defined by a radius;

said inner surface of said reverse-cup disposed in said bottom-tip being defined by a radius.

10. A piston for an internal combustion engine having a deep centrally-located bowl in which the outer walls of said centrally-located deep bowl are radially-spaced from the inner walls of the skirt of said piston in a plane transversal to that of the piston pin, and in which two deep peripheral cavities are formed on the underside of said crown of said piston which are exposed to the engine crankcase for improved cooling of the piston-ring grooves, said piston further characterized by:

having two annular oil-cooling galleries cast in the piston-pin struts, below said piston-crown and above the bearing hole for said piston-pin;

said annular oil-cooling galleries formed as a section of a circle with their maximum radius being less than the inner radius of said piston-ring grooves; both open ends of said annular semi-circular oil passages communicating with said cavities created between said outside walls of said piston bowl and said internal walls of said piston skirt.

11. A pre-combustion chamber for a diesel engine in which the lower housing of said pre-combustion chamber has an extension or throat projection ending on a cupped bottom-tip exposed to and protruding into the main combustion chamber; fluid communication between said pre-combustion chamber and said main combustion chamber being established through a plurality of transfer passages formed in the curved walls of said tip; said plurality of said transfer passages being peripherally disposed and circumferentially spaced about said centerline of said pre-combustion chamber; the centerlines of said peripheral transfer passages being angularly inclined in two different planes about said centerline of said pre-combustion chamber; said plurality of said transfer passages being formed with a tapered circular cross-section, with the narrow open-end of said passages being in proximity to said pre-combustion chamber and the wide open-end of said transfer passages being in proximity to said combustion chamber; said pre-combustion chamber further characterized by:

the total number of said transfer passages being limited to two, three, five, or more.

12. A pre-combustion chamber for a diesel engine in which the lower portion of the housing of said pre-combustion chamber has an extension or throat projection ending on a hemispherical bottom-tip; said bottom-tip being exposed to and protruding into the main combustion chamber; fluid communication between said pre-combustion chamber and said main combustion chamber being established through a plurality of transfer passages formed in the curved walls of said tip; all but one of said transfer passages being peripherally disposed and circumferentially spaced about said centerline of said pre-combustion chamber; said centerline of each of said peripheral transfer passages being angularly inclined in two different planes about said centerline of said pre-combustion chamber; said plurality of said transfer passages being formed with a tapered circular cross-section, with the narrow open-end of each of said passages being in proximity to said pre-combustion chamber and the wide open-end of each of said transfer passages being in proximity to said combustion chamber; said pre-combustion chamber further characterized by:

one of said plurality of said transfer passages being formed in said centerline of said pre-combustion chamber.

13. A pre-combustion chamber for a diesel engine in which the lower portion of the housing of said pre-combustion chamber has an extension or throat projection ending on a bottom-tip; said bottom-tip being exposed to and protruding into the main combustion chamber; fluid communication between said pre-combustion chamber and said main combustion chamber being established through a plurality of transfer passages formed in the walls of said bottom tip; said plurality of said transfer passages being formed with a tapered circular cross-section, with the narrow open-end of each of said tapered transfer passages being in proximity to said pre-combustion chamber and the wide open-end of each of said tapered transfer passages being in proximity to said combustion chamber; said plurality of said transfer passages being disposed so that one of them is centrally-located in said bottom tip, essentially aligned with the centerline of said pre-combustion chamber: and with the rest of said transfer passages peripherally-disposed and circumferentially-spaced about said centerline of said pre-combustion chamber; said centerline of each of said peripheral transfer passages being angularly inclined in two different planes about said centerline of said pre-combustion chamber; said pre-combustion chamber further characterized by:

said bottom tip of said housing of said pre-combustion chamber being formed as a cup within which a reverse cup is formed;

said reverse cup being smaller than the main cup in said housing of said pre-combustion chamber;

said reverse cup being formed as a section of a hemisphere; said reverse cup formed in the centerline of said prechamber;

said reverse cup having its cupped surface in proximity to said prechamber formed starting at a vertical point below the horizontal line described by the lower end of the plurality of said peripheral transfer passages.

* * * * *